(12) United States Patent
Seethaler et al.

(10) Patent No.: US 9,379,558 B2
(45) Date of Patent: Jun. 28, 2016

(54) DUAL RATE CHARGER FOR NOTEBOOK COMPUTER

(75) Inventors: Kenneth Scott Seethaler, Wake Forest, NC (US); Shigefumi Odaohhara, Kanagawa (JP); Hiromitsu Yamaguchi, Kanagawa (JP); Takumi Imai, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 797 days.

(21) Appl. No.: 13/042,907

(22) Filed: Mar. 8, 2011

(65) Prior Publication Data
US 2012/0229074 A1    Sep. 13, 2012

(51) Int. Cl.
*H02J 7/00* (2006.01)

(52) U.S. Cl.
CPC ................... *H02J 7/0021* (2013.01)

(58) Field of Classification Search
USPC .................. 320/107, 124–127, 103
See application file for complete search history.

(56) References Cited

U.S. PATENT DOCUMENTS

| | | | | |
|---|---|---|---|---|
| 5,565,756 A | * | 10/1996 | Urbish et al. | 320/103 |
| 5,721,481 A | * | 2/1998 | Narita et al. | 320/111 |
| 5,754,868 A | * | 5/1998 | Yamamoto et al. | 713/300 |
| 5,783,927 A | * | 7/1998 | Chen | 320/110 |
| 5,784,626 A | * | 7/1998 | Odaohara | 713/300 |
| 6,459,175 B1 | | 10/2002 | Potega | |
| 6,888,338 B1 | * | 5/2005 | Popescu-Stanesti et al. | 320/137 |
| 8,669,736 B2 | | 3/2014 | Seethaler et al. | |
| 2003/0085621 A1 | | 5/2003 | Potega et al. | |
| 2004/0217737 A1 | | 11/2004 | Popescu | |
| 2005/0162020 A1 | | 7/2005 | Lanni | |
| 2008/0143290 A1 | | 6/2008 | Chavakula | |
| 2009/0079262 A1 | | 3/2009 | Ohtomo | |
| 2009/0273319 A1 | | 11/2009 | Young et al. | |
| 2010/0201306 A1 | | 8/2010 | Kazama et al. | |
| 2011/0074360 A1 | | 3/2011 | Kerr et al. | |
| 2012/0286741 A1 | | 11/2012 | Seethaler et al. | |
| 2012/0299532 A1 | | 11/2012 | Seethaler et al. | |

OTHER PUBLICATIONS

"U.S. Appl. No. 13/106,362, Non Final Office Action mailed Aug. 29, 2014", 12 pgs.
"U.S. Appl. No. 13/106,362, Response filed Dec. 1, 2014 to Non Final Office Action mailed Aug. 29, 2014", 10 pgs.
"U.S. Appl. No. 13/106,362, Advisory Action mailed Jun. 16, 2014", 2 pgs.
"U.S. Appl. No. 13/106,362, Final Office Action mailed Apr. 10, 2014", 12 pgs.
"U.S. Appl. No. 13/106,362, Non Final Office Action mailed Dec. 24, 2013", 11 pgs.
"U.S. Appl. No. 13/106,362, Response filed Mar. 21, 2014 to Non Final Office Action mailed Dec. 24, 2013", 9 pgs.
"U.S. Appl. No. 13/106,362, Response filed Jun. 9, 2014 to Final Office Action mailed Apr. 10, 2014", 9 pgs.

(Continued)

*Primary Examiner* — Samuel Berhanu
(74) *Attorney, Agent, or Firm* — Schwegman, Lundberg & Woessner, P.A.

(57) ABSTRACT

A apparatus includes an AC adapter input, a main battery charger coupled to the input to charge a main battery, system logic to execute code stored on storage devices, and an expansion battery connector coupled to the input to provide sufficient current to enable charging of an expansion battery at a rate higher than a maximum charge rate of the main battery charger.

13 Claims, 5 Drawing Sheets

(56) References Cited

OTHER PUBLICATIONS

"U.S. Appl. No. 13/114,689 , Response filed Oct. 3, 2013 to Non Final Office Action mailed Jul. 17, 2013", 8 pgs.
"U.S. Appl. No. 13/114,689, Non Final Office Action mailed Jul. 17, 2013", 7 pgs.
"U.S. Appl. No. 13/114,689, Notice of Allowance mailed Oct. 25, 2013", 8 pgs.
"U.S. Appl. No. 13/114,689, Preliminary Amendment Filed Jun. 22, 2011", 7 pgs.
"U.S. Appl. No. 13/106,362, Advisory Action mailed Jul. 21, 2014", 3 pgs.
"U.S. Appl. No. 13/106,362, Response filed Jul. 9, 2014 to Final Office Action mailed Apr. 10, 2014", 9 pgs.
U.S. Appl. No. 13/106,362, filed May 12, 2011, Fast Battery Charging System and Method.

* cited by examiner

DUAL RATE CHARGER FOR NOTEBOOK COMPUTER

BACKGROUND

Many notebook computers offer a second battery option in addition to a main battery. The second battery may have a larger capacity that allows a working time to be extended while the notebook computer is running off battery power. The second battery may be charged at the same rate as the main battery. While many newer batteries may be charged at higher rates, the higher rates require larger circuits to handle increased current demand. Charging at higher rates also results in undesirable heat generation.

SUMMARY

A apparatus includes an AC adapter input, a main battery charger coupled to the input to charge a main battery, system logic to execute code stored on storage devices, and an expansion battery connector coupled to the input to provide sufficient current to enable charging of an expansion battery at a rate higher than a maximum charge rate of the main battery charger.

A method includes detecting whether an AC adapter coupled to a apparatus is capable of providing sufficient power to charge an expansion battery in an expansion battery unit coupled to the apparatus faster than a main battery charger in the apparatus, setting at least one switch in the apparatus to enable current to flow to the expansion battery, and providing a signal to control at least one switch in the expansion battery unit to enable an expansion battery charger to charge the expansion battery at a rate higher than a maximum charge rate of the main battery charger.

In a further embodiment, an expansion battery unit includes a connector to connect to a apparatus, an expansion battery, an expansion charger having charge rate that is higher than a maximum charge rate of a main battery charger of the apparatus, and a switch responsive to the apparatus to selectively couple the expansion charger to the expansion battery.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Figure 1:
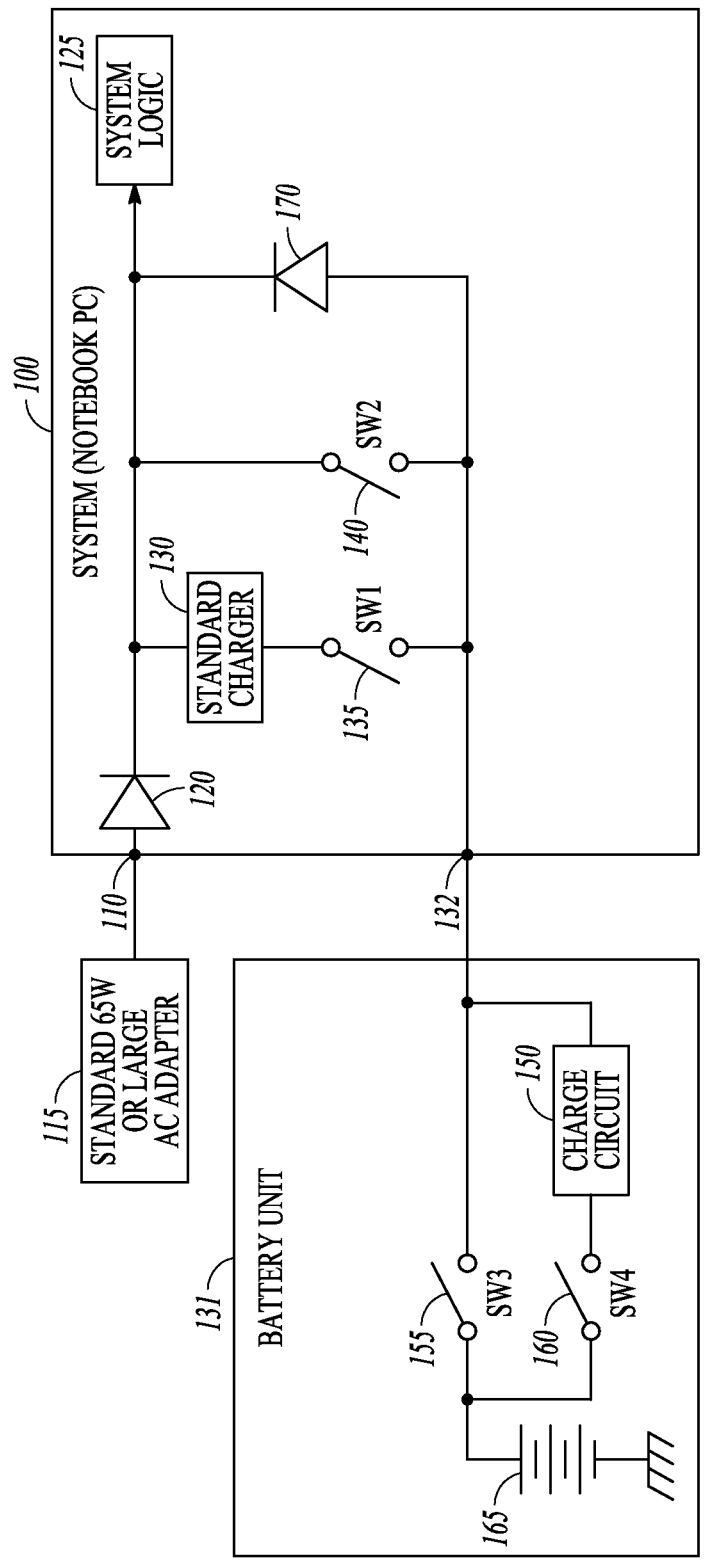
FIG. 1 is a block schematic diagram of notebook computer having two battery charge rates according to an example embodiment.

FIG. 1 is a block diagram of notebook computer 100 having two battery charge rates according to an example embodiment. The notebook computer has a power input 110 to couple to an AC adapter 115 or other power source that provides a suitable DC power source for the notebook. The power input 110 is coupled to a current direction control device such as a diode 120 to ensure current flows in one direction. Note that the term, diode, is meant to include a field effect transistor (FET) configured to behave as a diode with respect to current flow. An FET includes a parasitic diode (body diode) and a switch that are connected in parallel. When FET is off state (switch is off), it works as a diode. In some embodiments, FETs may be used to control current flow in all locations since FET exhibits low power losses. The adapter 115 provides power via the power input 110 and diode 120 for system logic 125 that executes programming to provide applications for users, as well as powering a monitor and other user interface devices.

Diode 120 is also coupled to a standard charging circuit 130 that provides current to charge a main battery, if attached to the notebook 100. Such a main battery and standard charging circuit are usually integrated within an enclosure or within the confines of a thin rectangular form factor common with notebook computers. The main battery may be coupled to fit within the form factor, but not necessarily within the enclosure of the notebook 100.

When a main battery is attached to a battery connector 132 of the notebook 100, a standard charge switch 135, coupled between the standard charging circuit 130 is closed, such that the main battery is charged at a standard rate that does not generate undesirable amounts of heat by the standard charging circuit 130. A high charge rate switch 140 is coupled directly between the diode 120, and the battery connector 132. When a higher capacity battery such as an expansion battery, represented by a battery unit 131 is coupled to the battery connector 132, the high charge rate switch 140 is closed, and the standard charge switch 135 is opened, allowing a higher current to flow to the battery unit 131.

Battery unit 131 includes a high rate charge circuit 150 that is coupled to the battery connector 132 when the expansion battery is coupled to the notebook computer 100. Battery unit 131 may be a standard main battery as described above without a high rate charge circuit, in which case a battery unit standard charge switch 155 is coupled directly to battery connector 132 and is in a closed position, bypassing the high rate charge circuit 150. High rate charge circuit 150 is coupled to a battery unit high rate charge switch 160. Switches 155 and 160 are selectively coupled to a charge storage device, or battery 165 to provide either the standard charge current generated by the standard charging circuit 130 in the notebook computer 100, or the higher charging current provided via high rate charge circuit 150, which is contained within the battery unit 131. Thus, higher amounts of heat generated at the higher charge rates is kept outside of the notebook computer 100 enclosure.

A second diode 170 in notebook computer 100 is used to provide current to the system logic 125 when the notebook computer 100 is running off of battery power.

In various embodiments, the notebook computer detects both the type of AC adapter that is attached, and whether it is capable of providing power sufficient for standard charge rates, or fast charge rates. Some AC adapters generate 65 watts of power, which is sufficient for standard charge rates. Other AC adapters generate 90 watts of power or more, which provides sufficient power to charge batteries at a higher rate.

Notebook computer 100 also detects whether a main battery is attached, utilizing standard charge rates, or an expansion battery unit is attached that is capable of being charged at higher rates. Notebook computer performs these detections of AC adapter and battery type by either interrogating the attached devices, via electromechanical switches, or via information provided by the AC adapter and battery via their connections to the notebook computer 100. The information regarding types of devices attached is used to control the switches 135 and 140 to provide either standard charging current via standard charge circuitry 130 and switch 135, or higher rate charging current via switch 140, bypassing the standard charge circuitry 130.

Notebook computer 100 may also provide information to the battery unit 131 regarding the type of charging current to be provided. In one embodiment, the notebook computer 100 directly controls the switches, whereas in other embodiments, the battery receives information from the notebook computer 100 regarding whether or not an AC adapter is capable of charging a higher rate charging current or standard charging current, and the battery uses that information to control the battery switches. Placing the high rate current charger in the expansion battery servers to place the heat, cost, and size into the expansion battery and outside the notebook computer 100 enclosure.

Figure 2:
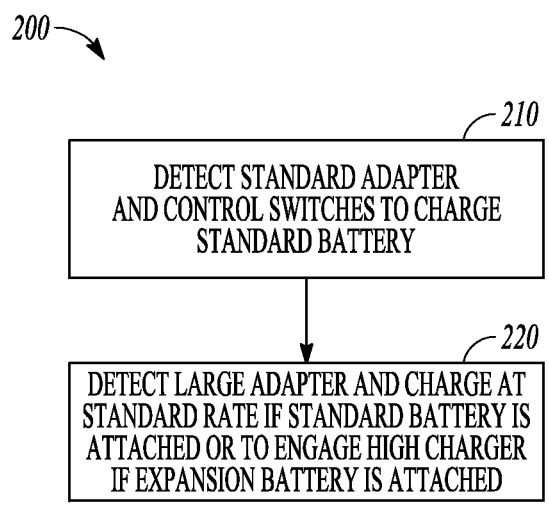
FIG. 2 is a flowchart illustrating a method of controlling the charge rate of a notebook computer according to an example embodiment.

FIG. 2 is a flowchart illustrating a method 200 of controlling the charge rate of a notebook computer according to an example embodiment. At 210, if a standard AC adapter is detected, the standard charger 130 is coupled to the battery unit 131 via switch 135, which is closed. Switch 155 is also closed with switch 160 open, or in the case of a standard battery, there is no need for switches 155, 160 and fast charger 150. If as indicated at 220, a larger AC adapter is detected, but only a standard battery is attached, the switches remain in the same state as set at 210. If however, an expansion battery with fast charger 150 is attached, then switch 135 is opened, switch 140 is closed in the notebook computer 100. Switch 155 in the battery unit 131 is then opened, and switch 160 is closed, such that higher current is provided to the fast charger 150, and the expansion battery is charged more quickly.

Figure 3:
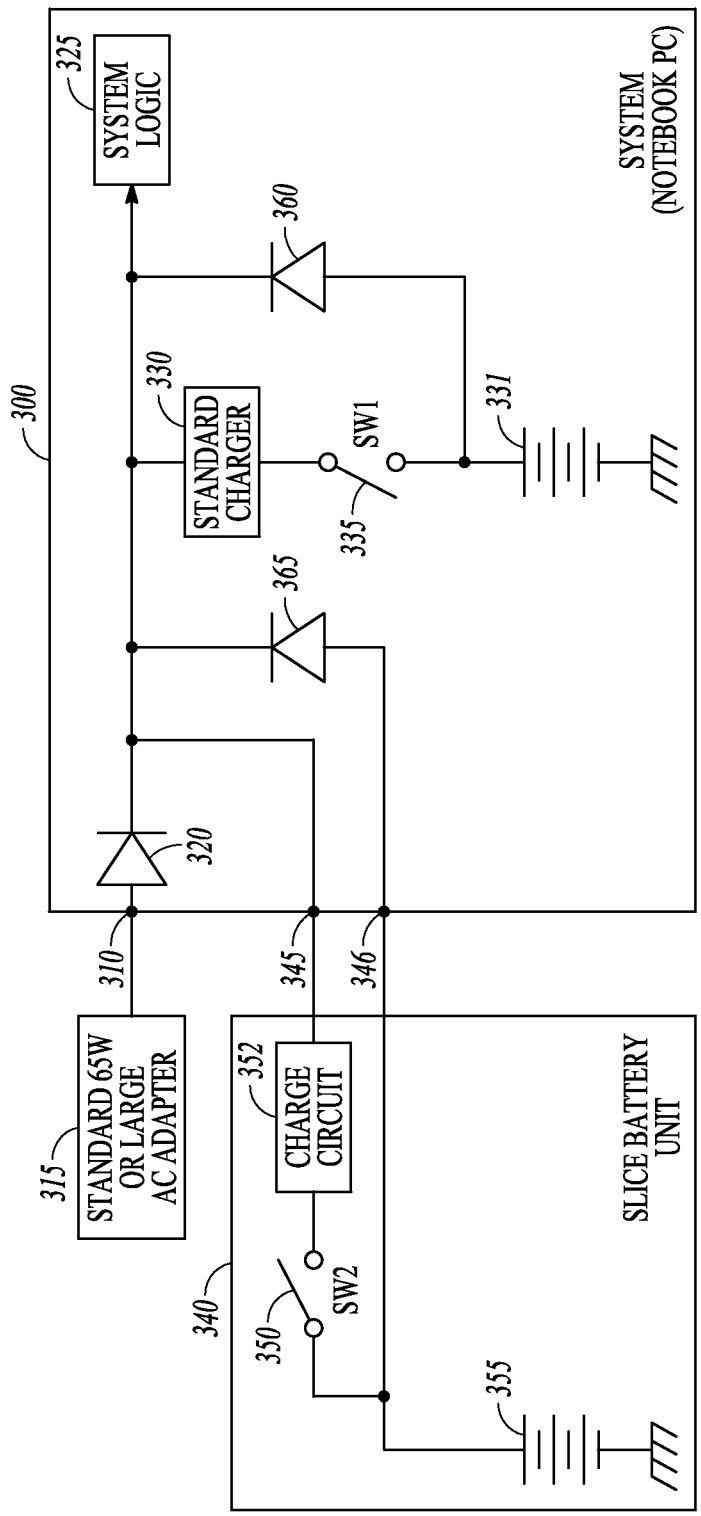
FIG. 3 is a block schematic diagram of an alternative notebook computer having two battery charge rates according to an example embodiment.

FIG. 3 is a block schematic diagram of a further embodiment of a notebook computer 300 having a fast charging capability. The notebook computer has a power input 310 to couple to an AC adapter 315 or other power source that provides a suitable DC power source for the notebook. The power input 310 is coupled to a diode 320 to ensure current flows in one direction. The adapter 315 provides power via the power input 310 and diode 320 for system logic 325 that executes programming to provide applications for users, as well as powering a monitor and other user interface devices.

Diode 320 is also coupled to a standard charging circuit 330 that provides current to charge a main battery 331. Main battery 331 and standard charging circuit 330 are usually integrated within an enclosure or within the confines of a thin rectangular form factor common with notebook computers. The main battery 331 may be coupled to fit within the enclosure of the notebook 300.

Main battery may be charged via the standard charging circuit 330 when a standard charge switch 335, coupled between the standard charging circuit 330 and main battery 331 is closed, such that the main battery 331 is charged at a standard rate that does not generate undesirable amounts of heat by the standard charging circuit 330.

When a higher capacity battery such as an expansion or slice battery, represented by a battery unit 340 is coupled to a battery connector indicated at 345 and 346, a high charge rate switch 350 in the battery unit 340 is closed, providing for a high charge rate current from fast charging circuitry 352 to be applied to a battery 355. In one embodiment, while the battery 355 is being charged, switch 335 is open, and battery 331 is not being charged. In further embodiments, if the capacity of the AC adapter 315 is sufficient, both switches 335 and 350 may be closed, allowing charging of both batteries by their respective charging circuitry 330 and 352.

A diode 360 in notebook computer 300 is coupled between main batter 331 and system logic 325 to provide one way current flow to the system logic 125 when the notebook computer 300 is using power from main battery 331. A diode 365 in notebook computer 300 is coupled between the battery connector 346 and system logic 325 to provide power to the system logic 325 from expansion battery 355. Batteries 331 and 355 are coupled to the system logic 325 in parallel through the respective diodes such that one or both may provide power to the system logic 325.

In various embodiments, the notebook computer 300 detects both the type of AC adapter that is attached, and whether it is capable of providing power sufficient for standard charge rates, or fast charge rates. Some AC adapters generate 65 watts of power, which is sufficient for standard charge rates. Other AC adapters generate 90 watts of power or more, which provides sufficient power to charge batteries at a higher rate.

In one embodiment, notebook computer 300 detects the type of AC adapter 315 and whether or not an expansion battery is attached, and controls switches 335 and 350 appropriately to charge one or both of the batteries with suitable current. In further embodiments, only one battery is charged at a time such that only one of the switches is closed at any given time. Both switches may be open when no AC adapter is attached.

Figure 4:
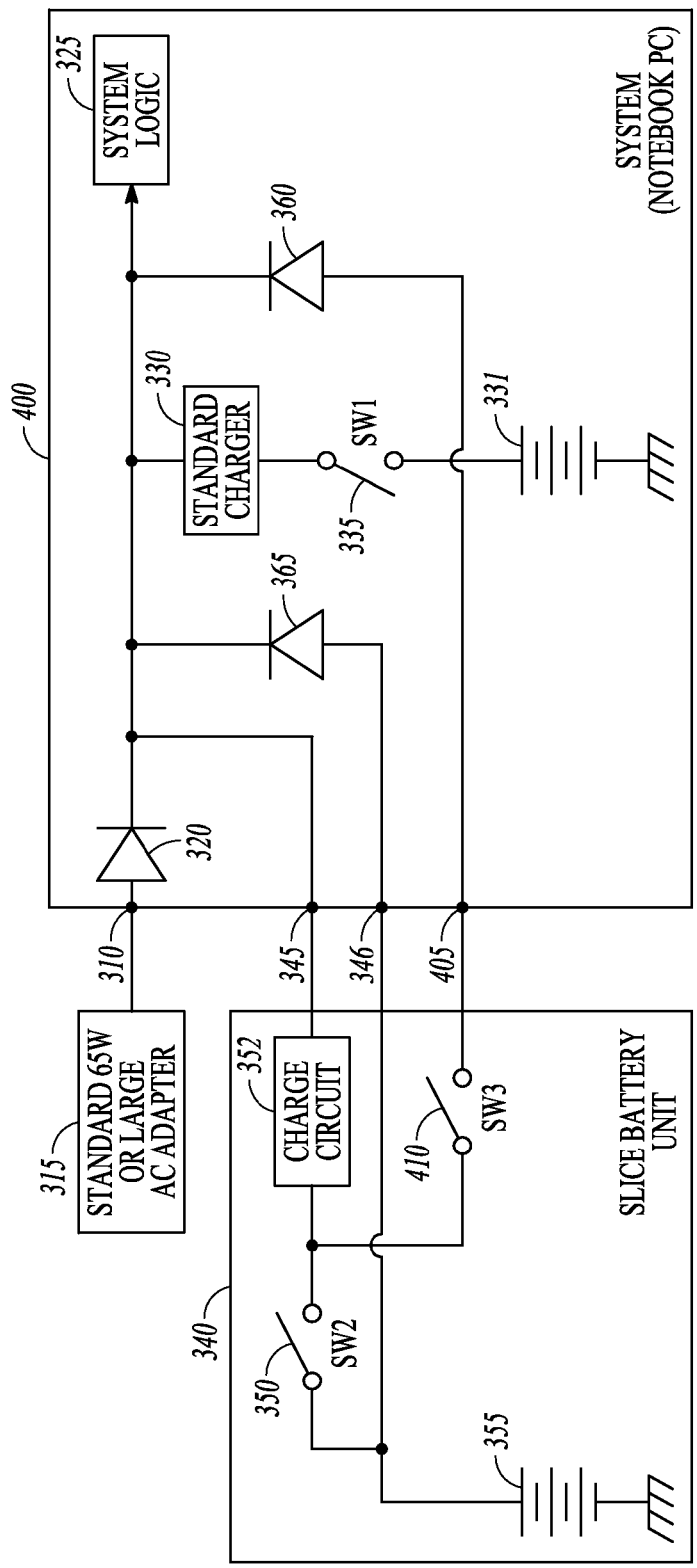
FIG. 4 is a block schematic diagram of a further alternative notebook computer having two battery charge rates according to an example embodiment.

FIG. 4 is a block schematic diagram of a further embodiment of a notebook computer 400 having a fast charging capability for both an expansion battery and the main battery. Notebook computer 400 is similar to notebook computer 300, and like parts are identified with the same reference numbers. Notebook computer has an additional line coupled to diode 360 and an input 405 to receive current from fast charger 352 when an additional switch 410 disposed between fast charter 352 and a corresponding output connector 415 is coupled to input 405.

In operation with a large capacity AC adapter, when the expansion battery 355 is coupled to the notebook computer 400, the fast charging circuitry 352 is coupled via switch 350, with switches 365 and 410 off, to charge battery 355 quickly. If there is no expansion battery unit attached, the main battery 331 is charged by closing switch 335. The other switches are not relevant, as they are part of the battery unit 340, which is not attached. In one embodiment, with an expansion battery unit 340 attached, the fast charging circuitry 352 may be used to charge the main battery by closing switch 410 with switches 350 and 335 open. As described above, computer 400 detects what is coupled to it, and executes algorithms according to the above descriptions of operation to control the switches.

Figure 5:
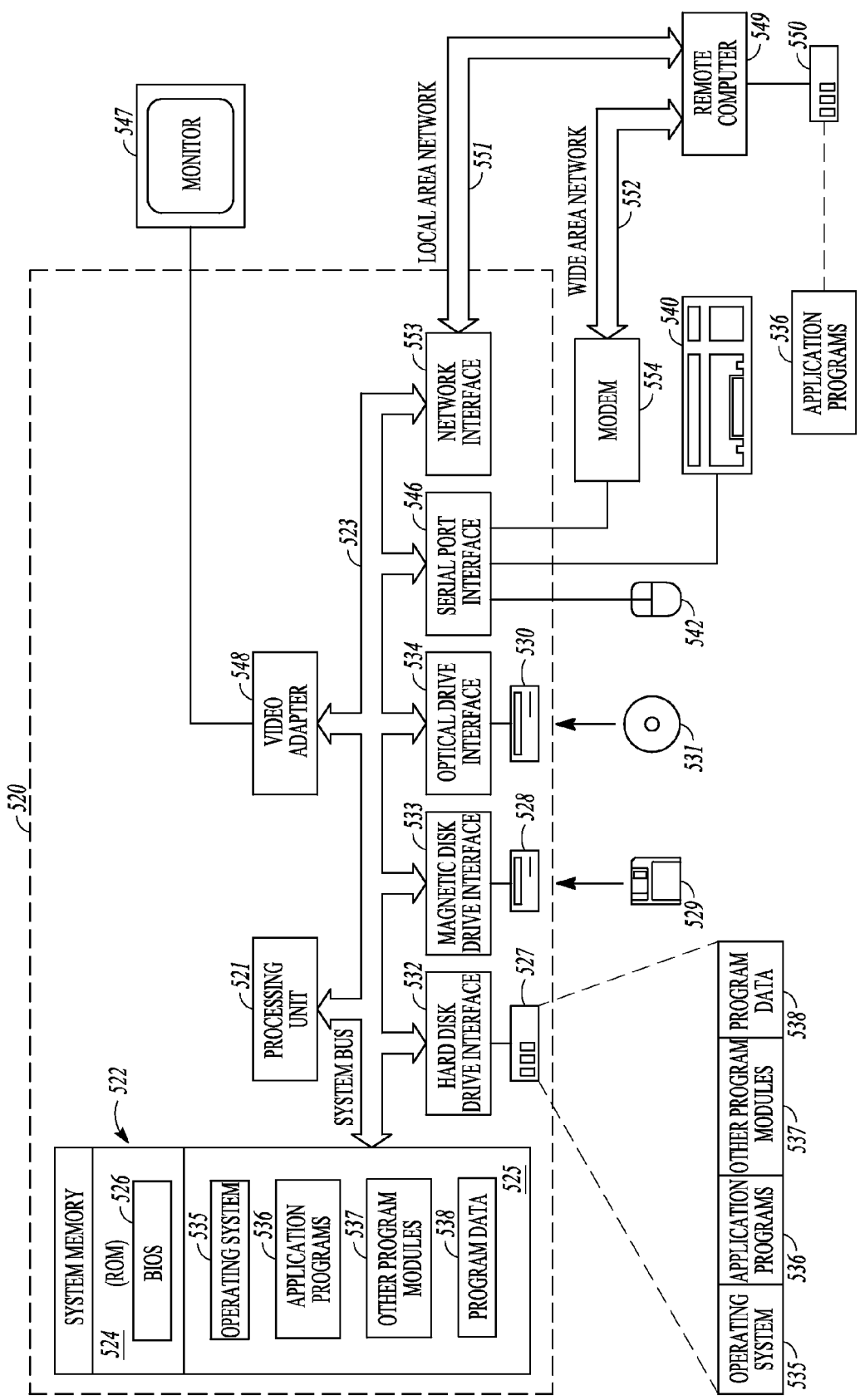
FIG. 5 is a block diagram of an information handling system according to an example embodiment.

FIG. 5 is a block diagram of a computer system to implement methods according to an example embodiment. In the embodiment shown in FIG. 5, a hardware and operating environment is provided.

As shown in FIG. 5, one embodiment of the hardware and operating environment includes a general purpose computing device in the form of a information handing device such as a computer 500 (e.g., a personal computer, notebook computer, workstation, server, slate, mobile phone, pad, server, and others), including one or more processing units 521, a system memory 522, and a system bus 523 that operatively couples various system components including the system memory 522 to the processing unit 521. There may be only one or there may be more than one processing unit 521, such that the processor of computer 500 comprises a single central-processing unit (CPU), or a plurality of processing units, commonly referred to as a multiprocessor or parallel-processor environment. In various embodiments, computer 500 is a conventional computer, a distributed computer, or any other type of computer.

The system bus 523 can be any of several types of bus structures including a memory bus or memory controller, a peripheral bus, and a local bus using any of a variety of bus architectures. The system memory can also be referred to as simply the memory, and, in some embodiments, includes read-only memory (ROM) 524 and random-access memory (RAM) 525. A basic input/output system (BIOS) program 526, containing the basic routines that help to transfer information between elements within the computer 500, such as during start-up, may be stored in ROM 524. The computer 500 further includes a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 couple with a hard disk drive interface 532, a magnetic disk drive interface 533, and an optical disk drive interface 534, respectively. The drives and their associated computer-readable media provide non volatile storage of computer-readable instructions, data structures, program modules and other data for the computer 500. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 529, optical disk 531, ROM 524, or RAM 525, including an operating system 535, one or more application programs 536, other program modules 537, and program data 538. Programming for implementing one or more processes or method described herein may be resident on any one or number of these computer-readable media.

A user may enter commands and information into computer 500 through input devices such as a keyboard 540 and pointing device 542. Other input devices (not shown) can include a microphone, joystick, game pad, satellite dish, scanner, or the like. These other input devices are often connected to the processing unit 521 through a serial port interface 546 that is coupled to the system bus 523, but can be connected by other interfaces, such as a parallel port, game port, or a universal serial bus (USB). A monitor 547 or other type of display device can also be connected to the system bus 523 via an interface, such as a video adapter 548. The monitor 547 can display a graphical user interface for the user. In addition to the monitor 547, computers typically include other peripheral output devices (not shown), such as speakers and printers.

The computer 500 may operate in a networked environment using logical connections to one or more remote computers or servers, such as remote computer 549. These logical connections are achieved by a communication device coupled to or a part of the computer 500; the invention is not limited to a particular type of communications device. The remote computer 549 can be another computer, a server, a router, a network PC, a client, a peer device or other common network node, and typically includes many or all of the elements described above I/O relative to the computer 500, although only a memory storage device 550 has been illustrated. The logical connections depicted in FIG. 5 include a local area network (LAN) 551 and/or a wide area network (WAN) 552. Such networking environments are commonplace in office networks, enterprise-wide computer networks, intranets and the internet, which are all types of networks.

When used in a LAN-networking environment, the computer 500 is connected to the LAN 551 through a network interface or adapter 553, which is one type of communications device. In some embodiments, when used in a WAN-networking environment, the computer 500 typically includes a modem 554 (another type of communications device) or any other type of communications device, e.g., a wireless transceiver, for establishing communications over the wide-area network 552, such as the internet. The modem 554, which may be internal or external, is connected to the system bus 523 via the serial port interface 546. In a networked environment, program modules depicted relative to the computer 500 can be stored in the remote memory storage device 550 of remote computer, or server 549. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The invention claimed is:

1. An apparatus comprising:
an alternating current (AC) adapter input to couple to an external AC adapter;
a main battery disposed within the computing device;
a main battery charger disposed within the computing device and coupled to the AC adapter input, the main battery charger to charge the main battery;
a first diode coupled between the main battery charger and the AC adapter input;
a processor and storage device disposed within the computing device to receive power from the main battery and coupled to receive power from the AC adapter input while bypassing the main battery charger;

a first external expansion battery connector coupled to the AC adapter input through the first diode, the first external expansion battery connector bypassing the main battery charger, the first external expansion battery connector to provide sufficient current from the AC adapter input to enable charging of an external expansion battery having an external battery charger at a rate higher than a maximum charge rate of the main battery charger, the external expansion battery external to the computing device;

a second external expansion battery connector coupled to the processor and storage device:

a second diode coupled between the second external expansion battery connector and the processor and storage device, the second diode to allow current to flow from the external expansion battery to the processor and storage device and the main battery charger; and a third diode coupled between the main battery and the processor and storage device, the third diode electrically in parallel with the main battery charger and to allow current to flow from the main battery to the processor and storage device;

wherein the first diode is also coupled between the AC adapter input and the first external expansion battery connector, the first diode to allow current to flow to the main battery charger, the processor and storage device, and the first external expansion battery connector.

2. The apparatus of claim and further comprising a switch between the main battery charger and a connector for the main battery to selectively couple the main battery charger to a main battery when the main battery is present.

3. The apparatus of claim 1 and further comprising logic to control a switch coupled between the external charger and the expansion battery in an expansion battery unit as a function of a size of the AC adapter coupled to the AC adapter input and a type of battery and expansion charger in the expansion battery unit coupled to the first expansion battery connector.

4. The apparatus of claim 1 wherein the first expansion battery connector selectively couples current from the AC adapter input to the external battery charger and provides current from the external expansion battery to the second expansion battery connector.

5. The apparatus of claim 4 further comprising a third expansion battery connector to couple the expansion battery charger to the main battery to charge the main battery.

6. The apparatus of claim 5 and further comprising logic to control a switch in an expansion battery unit as a function of a size of the AC adapter and a type of battery and expansion charger in the expansion battery unit.

7. The apparatus of claim 6 wherein the logic further selectively controls the switch and a further switch disposed within the computing device between the main battery charger and main battery.

8. The apparatus of claim 7 and further comprising an external expansion battery unit, the expansion battery unit comprising:

the external expansion charger having a charge rate that is higher than a maximum charge rate of the main battery charger;

the external expansion battery; and a switch coupled between the expansion charger and the expansion battery, wherein the switch is controllable by the logic.

9. A method of providing power to a computing device, the method comprising:

detecting whether an AC adapter coupled to the computing device is capable of providing sufficient power to charge an expansion battery in an external expansion battery unit coupled external to the computing device;

providing, when the AC adapter is coupled to the computing device, power from the AC adapter to a processor of the computing device through a first diode, bypassing a main battery charger electrically in parallel with the processor;

setting at least one switch in the external expansion battery unit to enable current to flow to the expansion battery;

providing a signal to control the at least one switch in the external expansion battery unit to enable an external expansion battery charger to charge the expansion battery at a rate higher than a maximum charge rate of the main battery charger;

providing, by a second diode coupled between the expansion battery and the processor, power from the expansion battery to processor;

providing, by a third diode electrically coupled in parallel with the main battery charger, power from a main battery internal to the computing device to the processor.

10. The method of claim 9 and further comprising selectively coupling the main battery charger to the main battery when the main battery is present.

11. The method of claim 9 and further comprising controlling the at least one switch in the expansion battery unit as a function of a size of the AC adapter and a type of the expansion battery and the expansion battery charger in the expansion battery unit.

12. The method of claim 9 and further comprising selectively controlling the at least one switch and a further switch in the expansion battery unit such that the expansion battery charger provides current only to the main battery.

13. A system comprising:

a computing device comprising:

an alternating current (AC) adapter input to couple to an external AC adapter;

a main battery disposed within the computing device;

a main battery charger disposed within the computing device and coupled to the AC adapter input, the main battery charger to charge the main battery;

a first diode coupled between the main battery charger and the AC adapter input;

a processor and storage device disposed within the computing device to receive power from the main battery and coupled to receive power from the AC adapter input while bypassing the main battery charger;

a first expansion battery connector coupled to the AC adapter input through the first diode, the first external expansion battery connector bypassing the main battery charger, the first external expansion battery connector to provide sufficient current from the AC adapter input to enable charging of an external expansion battery having an external battery charger at a rate higher than a maximum charge rate of the main battery charger, the external expansion battery external to the computing device;

a second expansion battery connector coupled to the processor and storage device;

a second diode coupled between the second external expansion battery connector and the processor and storage device, the second diode to allow current to flow from the external expansion battery to the processor and storage device and the main battery charger; and a third diode coupled between the battery and the processor and storage device, the third diode electrically in parallel with the main battery charger and to allow current to flow from the battery to the processor and storage device;

wherein the first diode is also coupled between the AC adapter input and the first external expansion battery connector, the first diode to allow current to flow to the main battery charger, the processor and storage device, and the first external expansion battery connector; and an expansion battery unit external to the computing device, the expansion battery unit comprising:

a first connector to connect to computing device via the first and second expansion battery connectors;

the expansion battery;

the expansion battery charger having charge rate that is higher than a maximum charge rate of a main battery charger disposed within the computing device;

a switch responsive to the external apparatus to selectively couple the expansion charger to the expansion battery and to receive charge current from the computing device higher than the maximum charge rate of the main battery charger of the computing device via the first expansion battery connector, wherein the higher charge current bypasses the main battery charger within the computing device; and a second connector coupled to the expansion battery for coupling to the computing device to provide power to the processor of the computing device, bypassing the main battery charger.

* * * * *